(12) United States Patent  
Haire

(10) Patent No.: US 7,384,051 B1  
(45) Date of Patent: Jun. 10, 2008

(54) FISHING CADDY APPARATUS KIT

(76) Inventor: Hilton L. Haire, 6406 Reno Ave., Newport Richey, FL (US) 34653

(*) Notice: Subject to any disclaimer, the term of this patent is extended or adjusted under 35 U.S.C. 154(b) by 4 days.

(21) Appl. No.: 11/441,333

(22) Filed: May 26, 2006

(51) Int. Cl.
  *B62B 3/00* (2006.01)
  *B62B 1/00* (2006.01)
  *B62B 5/00* (2006.01)
  *A01K 97/00* (2006.01)
  *A01K 97/04* (2006.01)
  *A01K 97/06* (2006.01)

(52) U.S. Cl. .............. 280/47.34; 280/79.11; 280/47.35; 280/79.5; 280/47.371; 43/54.1; 43/57.1; 43/4

(58) Field of Classification Search .......... 280/47.34, 280/79.11, 47.35, 79.5, 47.371, 54.1, 57.1, 280/4, 415.1, 416.1, 416.3, 442, 504, 515; 43/54.1, 4, 57.1

See application file for complete search history.

(56) References Cited

U.S. PATENT DOCUMENTS

| | | | |
|---|---|---|---|
| 4,355,818 A | 10/1982 | Watts | |
| 5,159,777 A * | 11/1992 | Gonzalez | 43/54.1 |
| 5,163,694 A * | 11/1992 | Reichek | 280/47.26 |
| 5,305,544 A * | 4/1994 | Testa, Jr. | 43/54.1 |
| 5,333,885 A | 8/1994 | Pullman | |
| 5,449,224 A * | 9/1995 | Johnson | 298/2 |
| 5,611,561 A | 3/1997 | Dale, II | |
| D410,784 S | 6/1999 | Sandford et al. | |
| 6,076,298 A * | 6/2000 | Teel | 43/54.1 |
| 6,669,304 B2 * | 12/2003 | Binning | 298/17.7 |
| 6,868,581 B2 * | 3/2005 | Browder | 16/110.1 |
| 6,883,267 B1 * | 4/2005 | Pruitt | 43/54.1 |
| 6,896,282 B1 * | 5/2005 | McKinley | 280/495 |
| 7,210,697 B2 * | 5/2007 | Simpson | 280/415.1 |
| 2002/0005625 A1 * | 1/2002 | Palmer | 280/477 |
| 2002/0070517 A1 * | 6/2002 | Ramsey | 280/47.19 |
| 2002/0095947 A1 * | 7/2002 | Treppedi et al. | 62/457.9 |
| 2003/0122348 A1 * | 7/2003 | Li | 280/504 |
| 2005/0055869 A1 * | 3/2005 | Corso et al. | 43/54.1 |
| 2007/0051031 A1 * | 3/2007 | Allen | 43/54.1 |
| 2007/0119093 A1 * | 5/2007 | Jaskulski | 43/54.1 |

* cited by examiner

*Primary Examiner*—Christopher Ellis  
*Assistant Examiner*—John R Olszewski

(57) ABSTRACT

A fishing caddy apparatus kit includes a housing having a bottom wall and a peripheral wall that is attached to and extends upwardly from the bottom wall. The peripheral wall includes a front wall, a rear wall, a first lateral wall and a second lateral wall. A pair of axles is attached to the housing and each has a pair of free ends. Wheels are attached to each of the free ends. A plurality of containers is provided and each is positioned in the housing and extends upwardly above an upper edge of the peripheral wall. A female coupler is attached to one of said axles and extends forward of the front wall. A plurality of pulling members is provided. Each of the pulling members is selectively engaged to the female coupler. A fastener is removably extendable through the female coupler and an engaged one of the pulling members.

10 Claims, 4 Drawing Sheets

FISHING CADDY APPARATUS KIT

BACKGROUND OF THE INVENTION

1. Field of the Invention

The present invention relates to fishing caddy devices and more particularly pertains to a new fishing caddy device for holding and transporting a plurality of items to be used by a person while the person is fishing.

2. Description of the Prior Art

The use of fishing caddy devices is known in the prior art. While these devices fulfill their respective, particular objectives and requirements, the need remains for a device that allows a person to selectively determine how to pull, for transportation purposes, a plurality of fishing items. Further, the device should include a plurality of containers for holding bait as well as fishing rod holding members.

SUMMARY OF THE INVENTION

The present invention meets the needs presented above by generally comprising a housing having a bottom wall and a peripheral wall that is attached to and extends upwardly from the bottom wall. The peripheral wall includes a front wall, a rear wall, a first lateral wall and a second lateral wall. A pair of axles is attached to the housing. Each of the axles is positioned adjacent to the bottom wall and each is orientated parallel to a plane of the front wall. Each of the axles has a pair of free ends. Wheels are attached to each of the free ends. A plurality of containers is provided and each is positioned in the housing and extends upwardly above an upper edge of the peripheral wall. A female coupler is attached to a forward one of the axles and extends forward of the front wall. A plurality of pulling members is provided. Each of the pulling members is selectively engaged to the female coupler. A fastener is removably extendable through the female coupler and an engaged one of the pulling members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
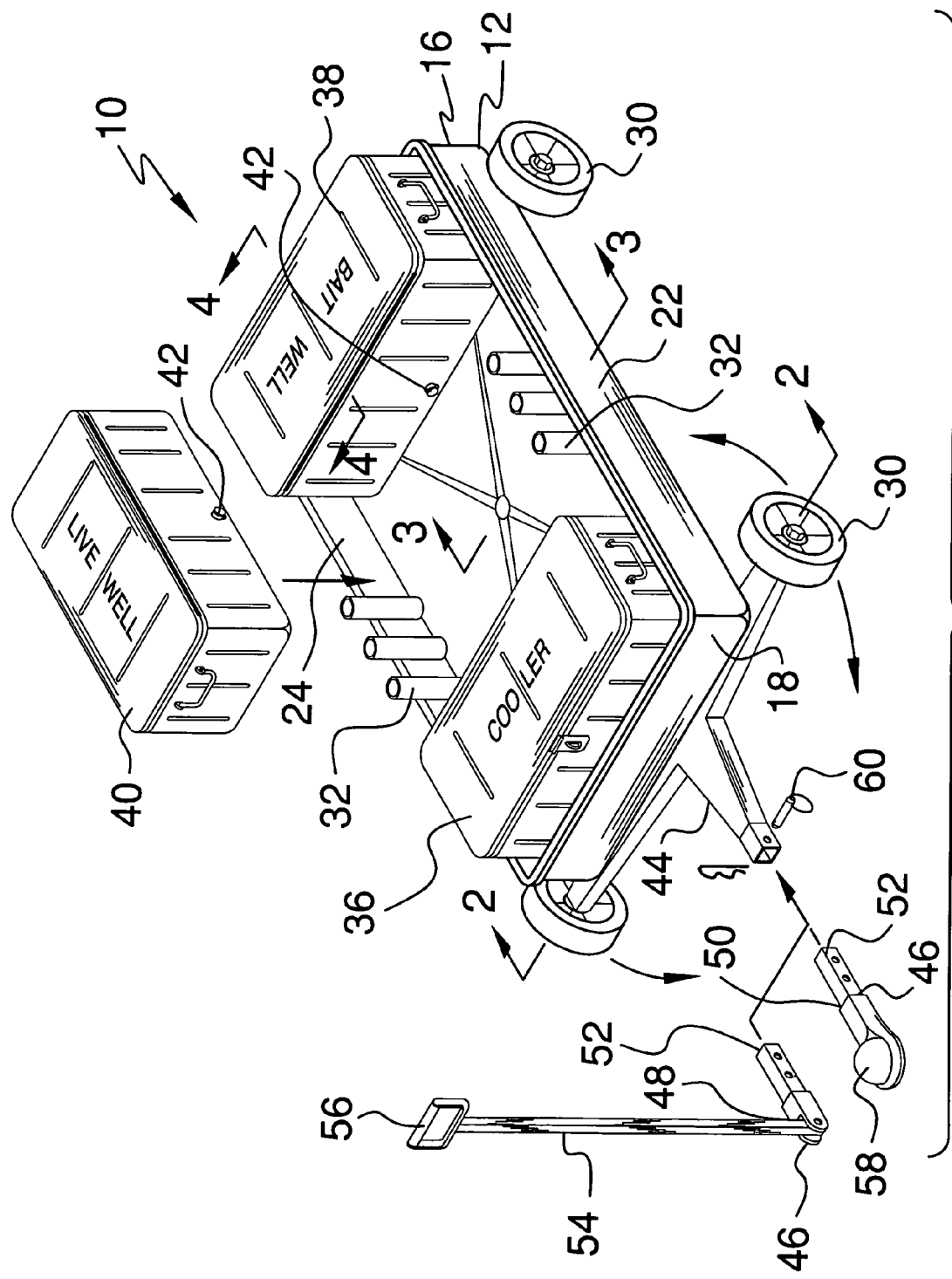
FIG. 1 is a perspective view of a fishing caddy apparatus kit according to the present invention.
Figure 2:
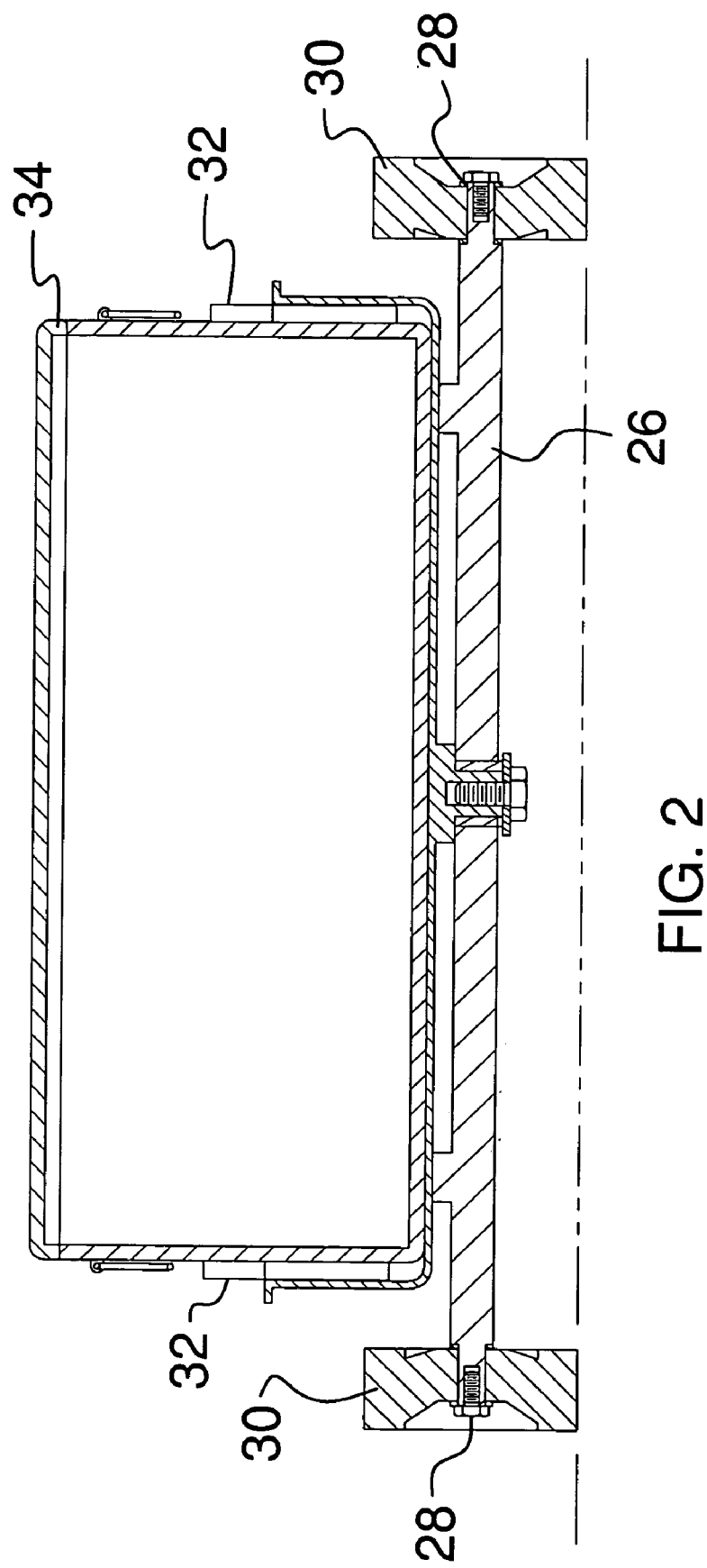
FIG. 2 is a cross-sectional view taken along line 2-2 of FIG. 1 of the present invention.
Figure 3:
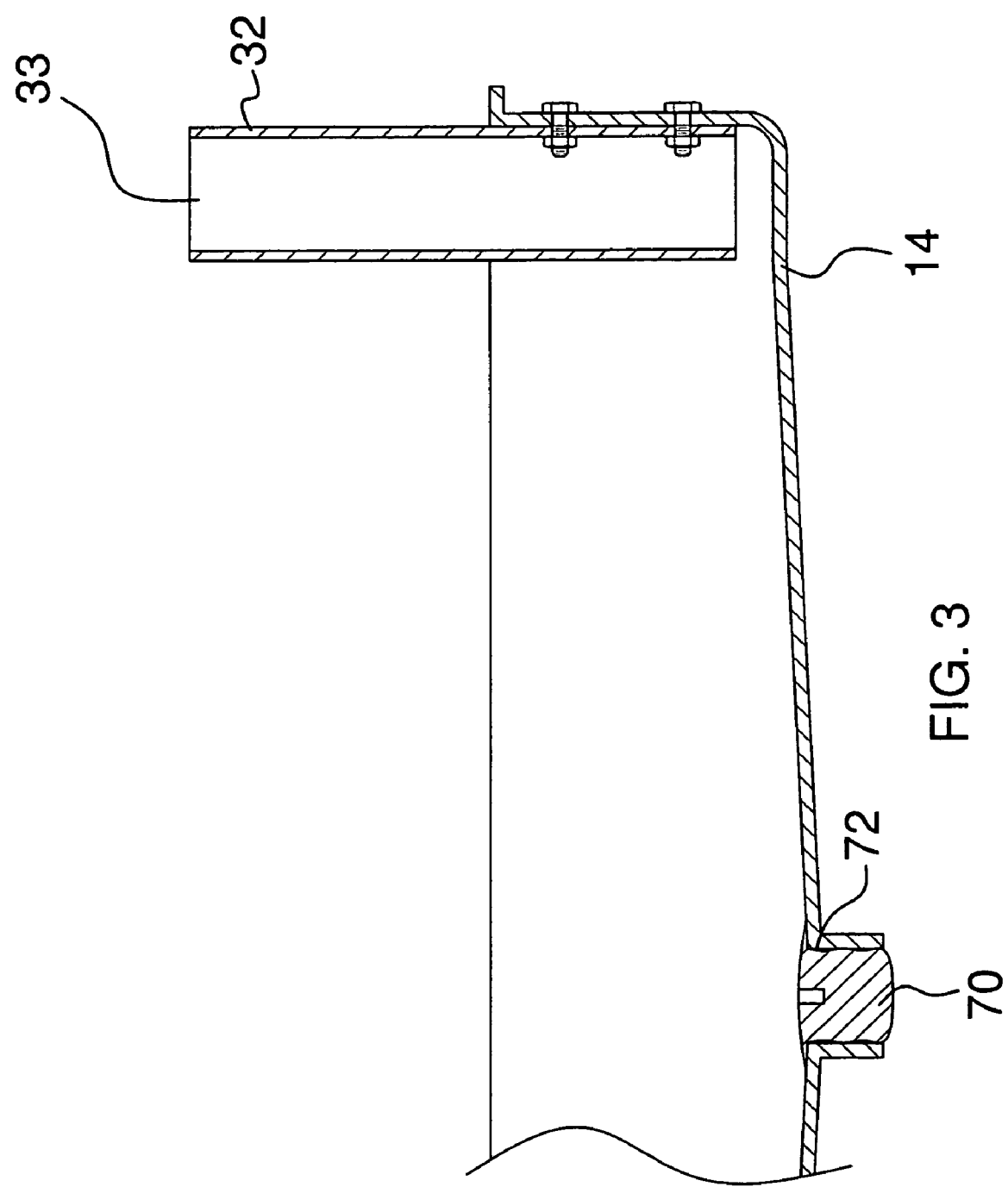
FIG. 3 is a cross-sectional view taken along line 3-3 of FIG. 1 of the present invention.
Figure 4:
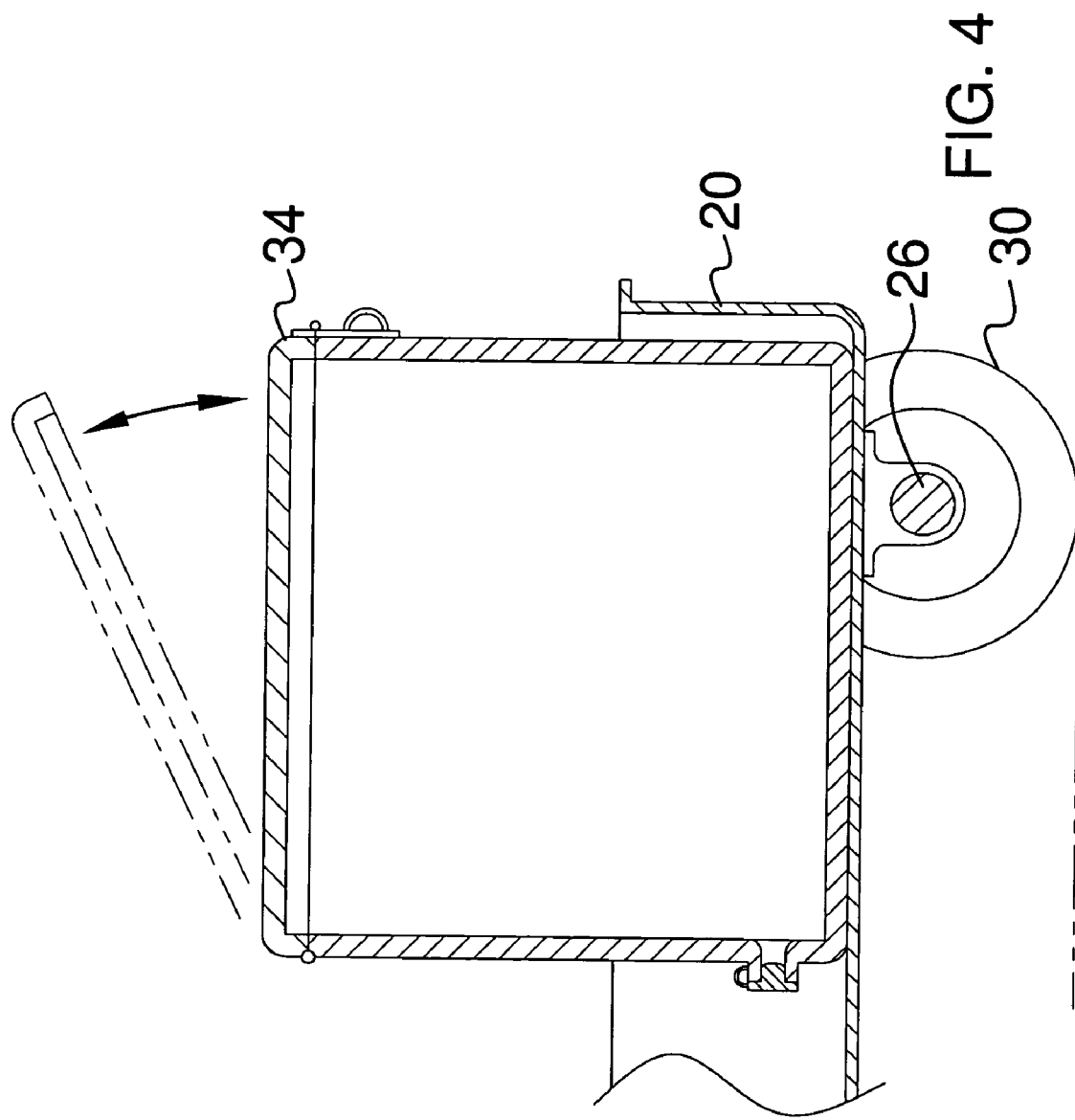
FIG. 4 is a cross-sectional view taken along line 4-4 of FIG. 1 of the present invention.

With reference now to the drawings, and in particular to FIGS. 1 through 4 thereof, a new fishing caddy device embodying the principles and concepts of the present invention and generally designated by the reference numeral 10 will be described.

As best illustrated in FIGS. 1 through 4, the fishing caddy apparatus kit 10 generally comprises a housing 12 having a bottom wall 14 and a peripheral wall 16 that is attached to and extends upwardly from the bottom wall 14. The peripheral wall 16 includes a front wall 18, a rear wall 20, a first lateral wall 22 and a second lateral wall 24. The housing 12 has a width from the first lateral wall 22 to the second lateral wall 24 between 18 inches and 36 inches. The housing 12 has a length from the front wall 18 to the rear wall 20 between 36 inches and 48 inches. The peripheral wall 16 has a height between 5 inches and 10 inches. The bottom wall 14 slopes downwardly toward a central area of the bottom wall 14. A plug 70 is positioned in an aperture positioned 72 in the central area of the bottom wall 14.

A pair of axles 26 is attached to the housing 12. Each of the axles 26 is positioned adjacent to the bottom wall 14 and each is orientated parallel to a plane of the front wall 18. Each of the axles 26 has a pair of free ends 28. A plurality of wheels 30 is provided. Each of the wheels 30 is rotatably coupled to one of the free ends 28. A forward one of the axles 26, positioned adjacent to the front wall 18, is pivotable with respect to the housing 12.

A plurality of tubes 32 is provided. Each of the tubes 32 is attached to an inner surface of the peripheral wall 16 and each is vertically orientated and has an open upper end 33. The tubes 32 are each attached to one of the first 22 and second 24 lateral walls and are spaced away from the front 18 and back 20 walls. The plurality of tubes 32 consists of three tubes 32 attached to the first lateral wall 22 and three tubes 32 attached to the second lateral wall 22.

A plurality of containers 34 is provided. Each of the containers 34 is positioned in the housing 12 and extends upwardly above an upper edge of the peripheral wall 16. The plurality of containers 34 includes a thermally insulated cooler 36 positioned adjacent to the front wall 18, a bait well 38 positioned adjacent to the back wall 20, and a live well 40 positioned between and extending between the cooler 36 and the bait well 38. The live well 40 and bait well 38 each include a plug 42 for efficient draining thereof. Each of the tubes 32 is positioned between the live well 40 and one of the first 22 and second 24 lateral walls.

A female coupler 44 is attached to the forward one of the axles 26 and extends forward of the front wall 18. A plurality of pulling members 46 is provided. Each of the pulling members 46 is selectively engaged to the female coupler 44. The plurality of pulling members 46 comprises a group consisting of an elongated handle 48 and a trailer hitch 50. The elongated handle 48 and the trailer hitch 50 each include a male coupler 52 that is removably extendable into the female coupler 44. The elongated handle 48 includes an elongated bar 54 that is hingedly coupled to an associated male coupler 52. A handle 56 is attached to a free end of the elongated bar 54. The male coupler 52 of the trailer hitch 50 is attached to a ball hitch 58 so that it may, in turn, be attached to a ball mounted on an ATV or bike. A fastener 60 is removably extendable through the female coupler 44 and an engaged one of the pulling members 46.

In use, the containers 34 are filled with conventional materials such as food and bait for use during fishing and the ends of fishing rods are extended into the tubes 32. When fish are caught, they may be positioned in the live well 40. The housing 12 allow a person to easily transport all of their fishing gear where needed and back.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing caddy kit assembly comprising:
   a housing having a bottom wall and a peripheral wall being attached to and extending upwardly from said bottom wall, said peripheral wall including a front wall, a rear wall, a first lateral wall and a second lateral wall;
   a pair of axles being attached to said housing, each of said axles being positioned adjacent to said bottom wall and each being orientated parallel to a plane of said front wall, each of said axles having a pair of free ends;
   a plurality of wheels, each of said wheels being rotatably coupled to one of said free ends;
   a plurality of tubes, each of said tubes being attached to an inner surface of said peripheral wall, each of said tubes being vertically orientated and having an open upper end;
   a plurality of containers being removably positioned in said housing and extending upwardly above an upper edge of said peripheral wall;
   a female coupler being attached to a forward one of said axles and extending forward of said front wall;
   a plurality of pulling members, each of said pulling members being selectively engaged to said female coupler; and
   a fastener being removably extendable through said female coupler and an engaged one of said pulling members.

2. The assembly according to claim 1, wherein said housing has a width from said first lateral wall to said second lateral wall between 18 inches and 36 inches, said housing having a length from said front wall to said rear wall between 36 inches and 48 inches, said peripheral wall having a height between 5 inches and 10 inches.

3. The assembly according to claim 1, wherein each of said tubes is attached to one of said first and second lateral walls and being spaced away from said front and rear walls.

4. The assembly according to claim 3, wherein said plurality of tubes consists of three tubes attached to said first lateral wall and three tubes attached to said second lateral wall.

5. The assembly according to claim 3, wherein said plurality of containers includes a thermally insulated cooler positioned adjacent to said front wall, a bait well positioned adjacent to said rear wall, and a live well positioned between and extending between said cooler and said bait well, each of said tubes being positioned between said live well and one of said first and second lateral walls.

6. The assembly according to claim 1, wherein said plurality of containers includes a thermally insulated cooler positioned adjacent to said front wall, a bait well positioned adjacent to said rear wall, and a live well positioned between and extending between said cooler and said bait well.

7. The assembly according to claim 1, wherein said plurality of pulling members comprises a group consisting of an elongated handle and a trailer hitch, said elongated handle and said trailer hitch each including a male coupler being removably extendable into said female coupler.

8. The assembly according to claim 7, wherein said elongated handle includes an elongated bar being hingedly coupled to an associated male coupler, a handle being attached to a free end of said elongated bar, said male coupler of said trailer hitch being attached to a ball hitch.

9. The assembly according to claim 1, wherein said bottom wall is sloped downwardly toward a central area of said bottom wall, a plug being removably positioned in an aperture extending through said bottom wall.

10. A fishing caddy kit assembly comprising:
    a housing having a bottom wall and a peripheral wall being attached to and extending upwardly from said bottom wall, said peripheral wall including a front wall, a rear wall, a first lateral wall and a second lateral wall, said housing having a width from said first lateral wall to said second lateral wall between 18 inches and 36 inches, said housing having a length from said front wall to said rear wall between 36 inches and 48 inches, said peripheral wall having a height between 5 inches and 10 inches, said bottom wall being sloped downwardly toward a central area of said bottom wall, a plug being removably positioned in an aperture extending through said bottom wall;
    a pair of axles being attached to said housing, each of said axles being positioned adjacent to said bottom wall and each being orientated parallel to a plane of said front wall, each of said axles having a pair of free ends, a forward one of said axles being pivotally coupled to said housing;
    a plurality of wheels, each of said wheels being rotatably coupled to one of said free ends;
    a plurality of tubes, each of said tubes being attached to an inner surface of said peripheral wall, each of said tubes being vertically orientated and having an open upper end, each of said tubes being attached to one of said first and second lateral walls and being spaced away from said front and rear walls, said plurality of tubes consisting of tree tubes attached to said first lateral wall and three tubes attached to said second lateral wall;
    a plurality of containers being removably containers being positioned in said housing and extending upwardly above an upper edge of said peripheral wall, said plurality of containers including a thermally insulated cooler positioned adjacent to said front wall, a bait well positioned adjacent to said rear wall, and a live well positioned between and extending between said cooler and said bait well, each of said tubes being positioned between said live well and one of said first and second lateral walls;
    a female coupler being attached to said forward one of said axles and extending forward of said front wall;
    a plurality of pulling members, each of said pulling members being selectively engaged to said female coupler, said plurality of pulling members comprising a group consisting of an elongated handle and a trailer hitch, said elongated handle and said trailer hitch each including a male coupler being removably extendable into said female coupler, said elongated handle including an elongated bar being hingedly coupled to an associated male coupler, a handle being attached to a free end of said elongated bar, said male coupler of said trailer hitch being attached to a ball hitch; and a fastener being removably extendable through said female coupler and an engaged one of said pulling members.

* * * * *